F. C. SCHOFIELD.
TOBACCO STEMMING MACHINE.
APPLICATION FILED AUG. 2, 1915.

1,268,392.

Patented June 4, 1918.
10 SHEETS—SHEET 1.

Inventor:
Frederick C. Schofield,

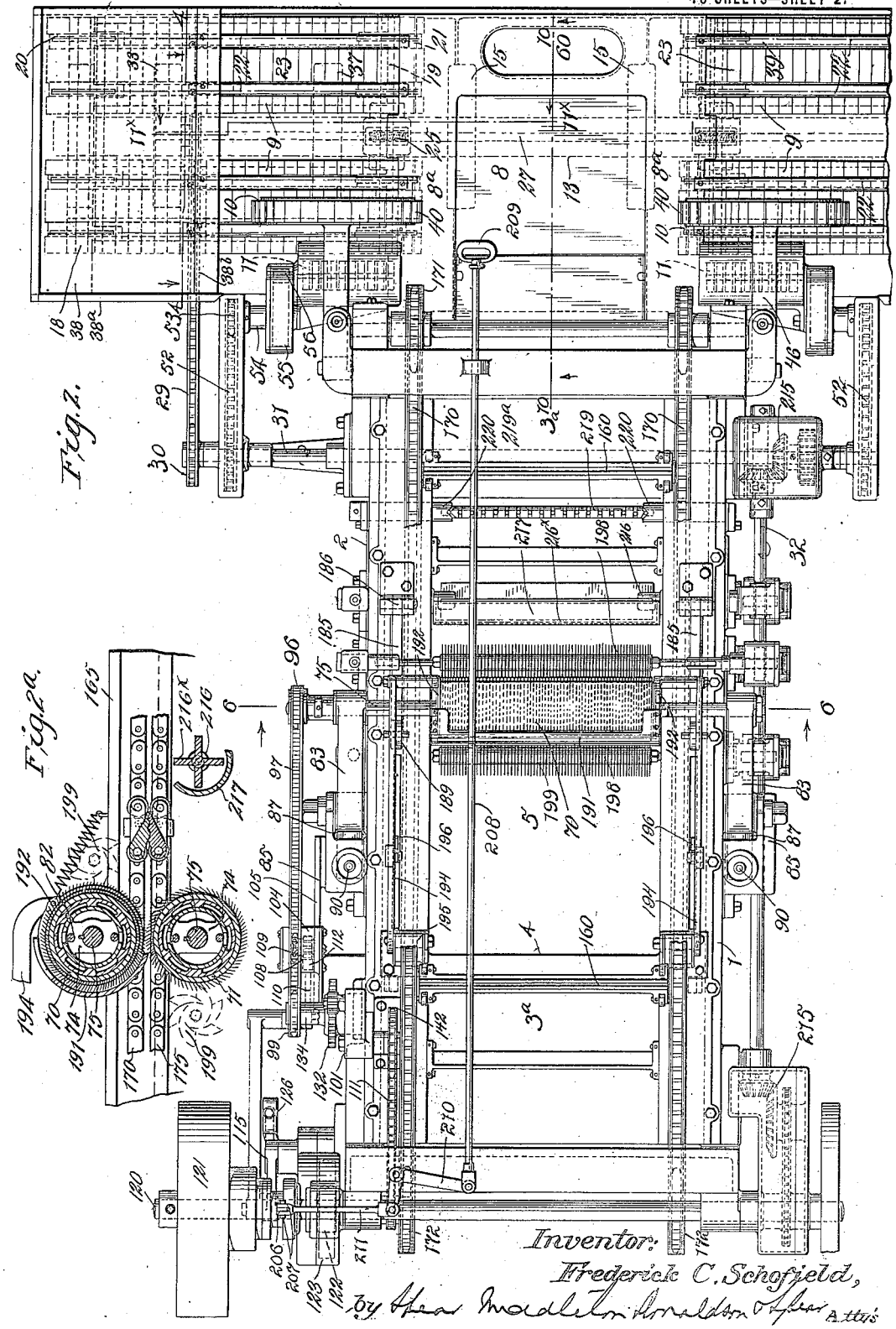

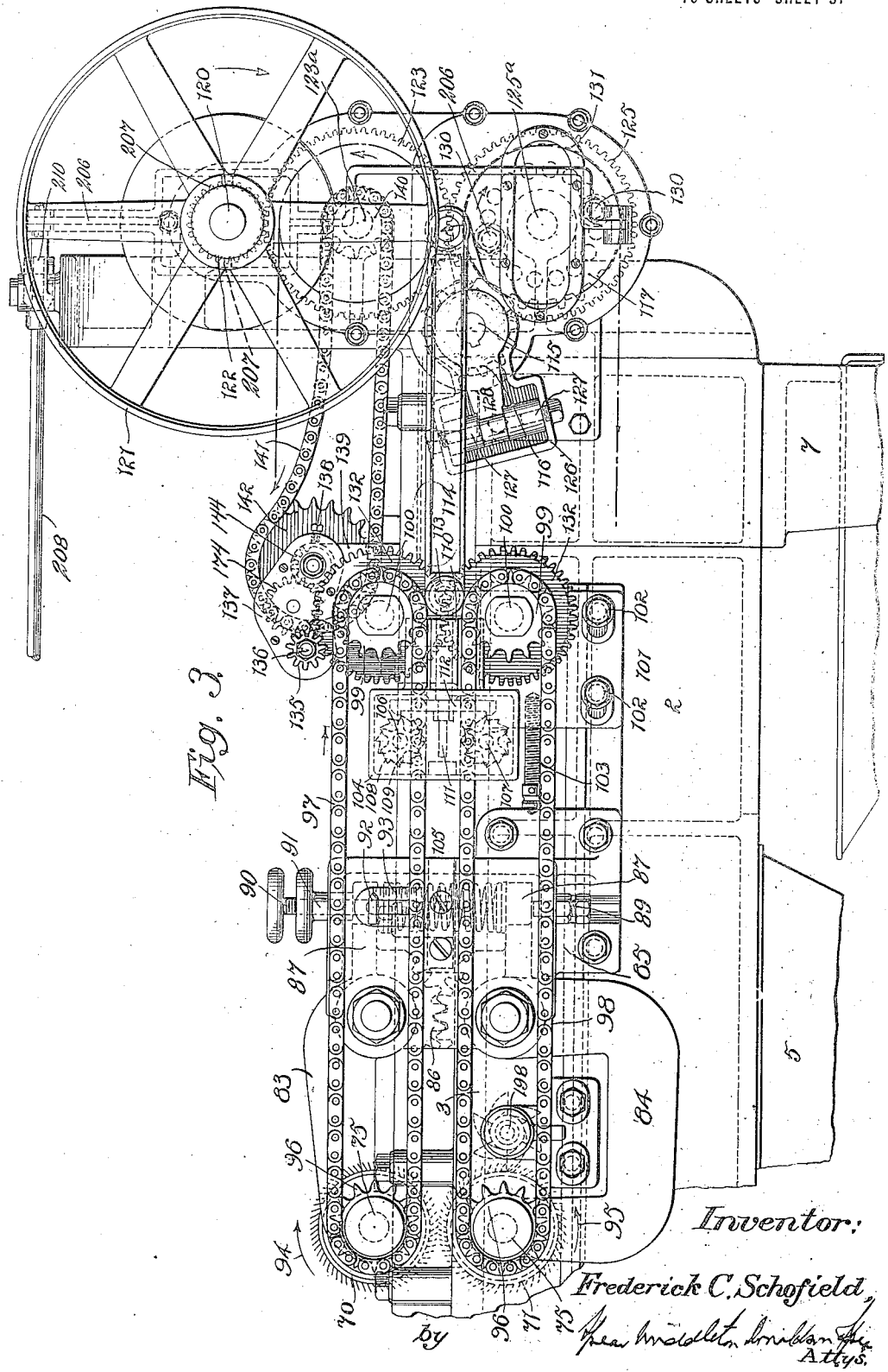

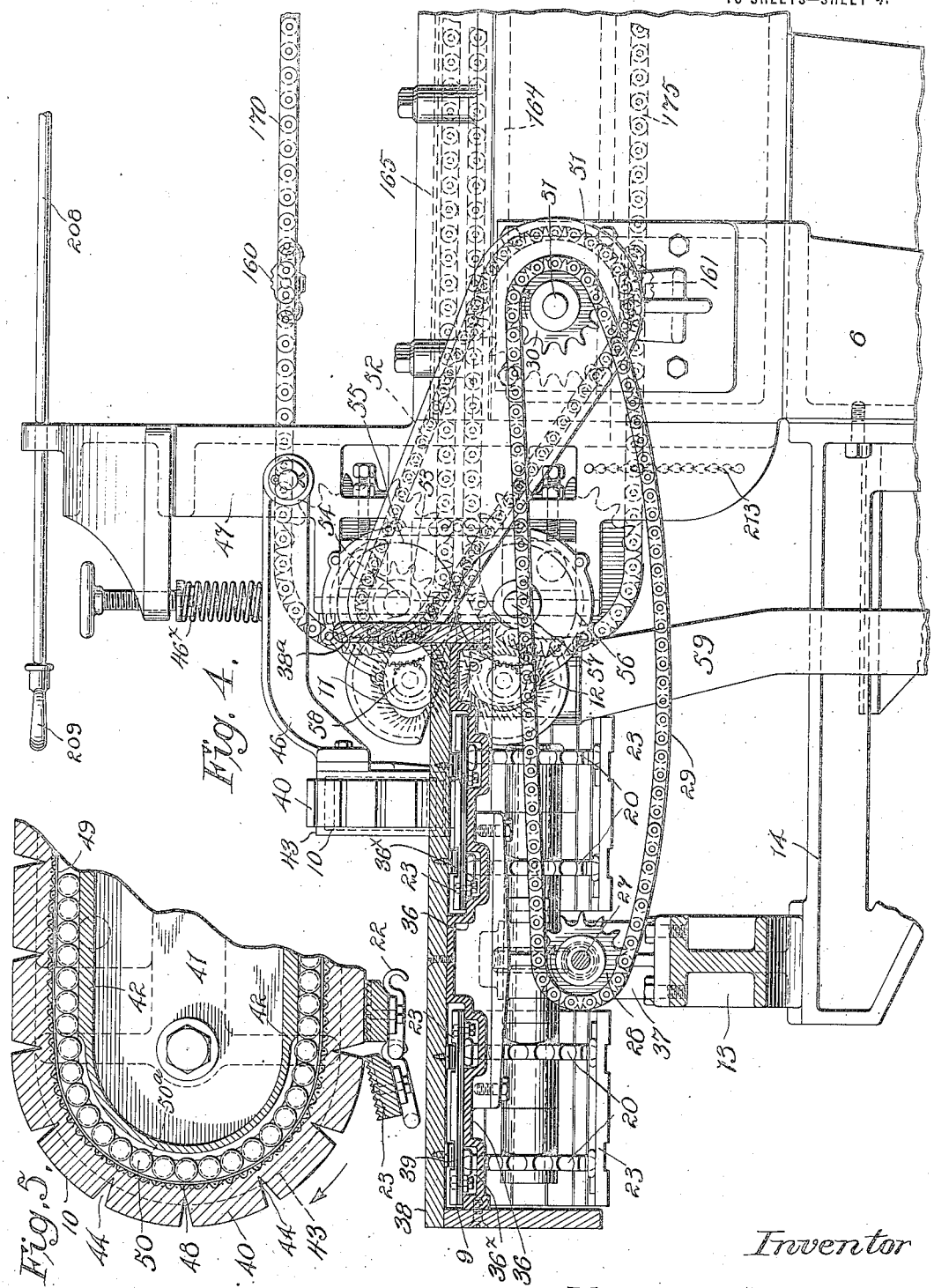

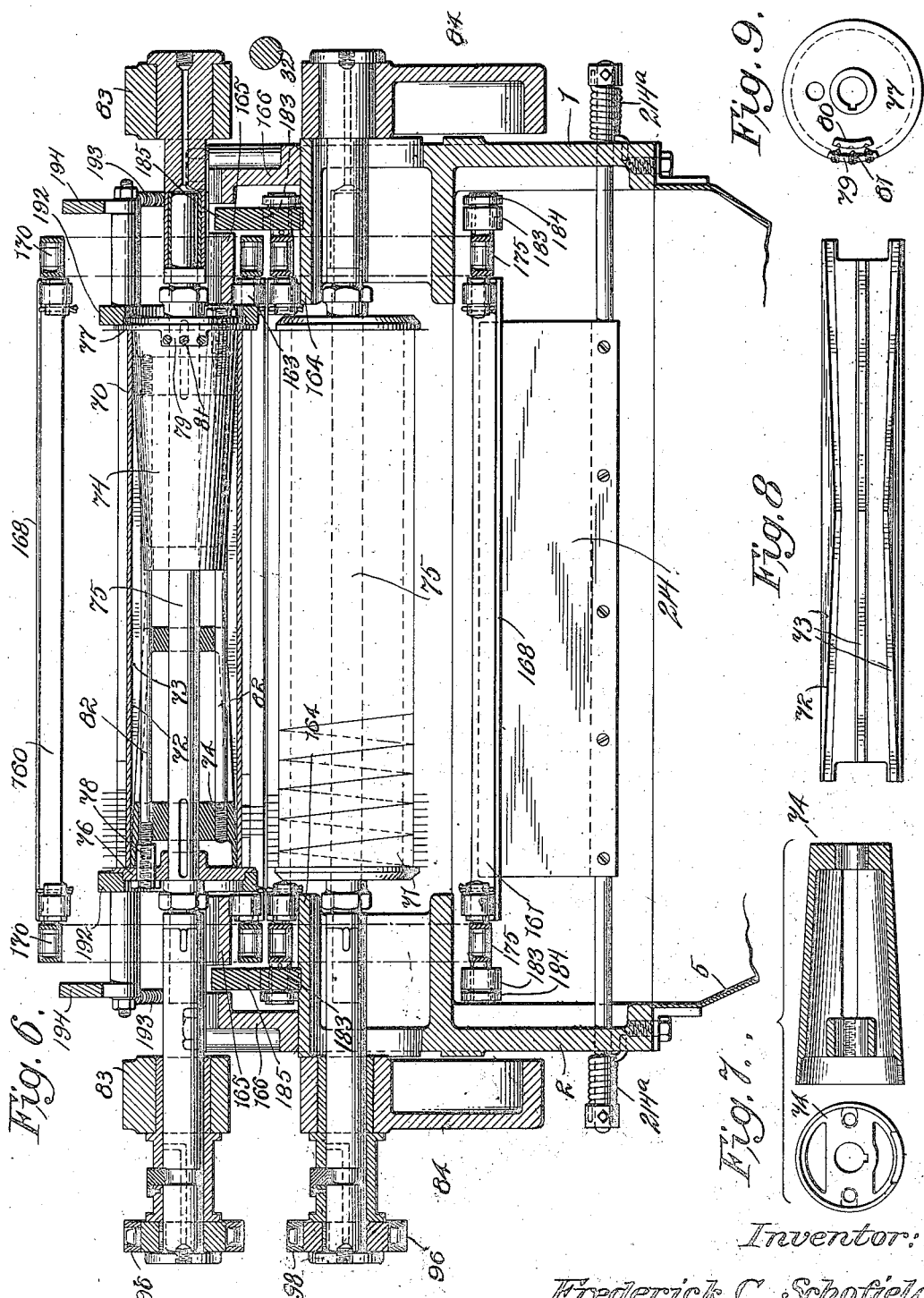

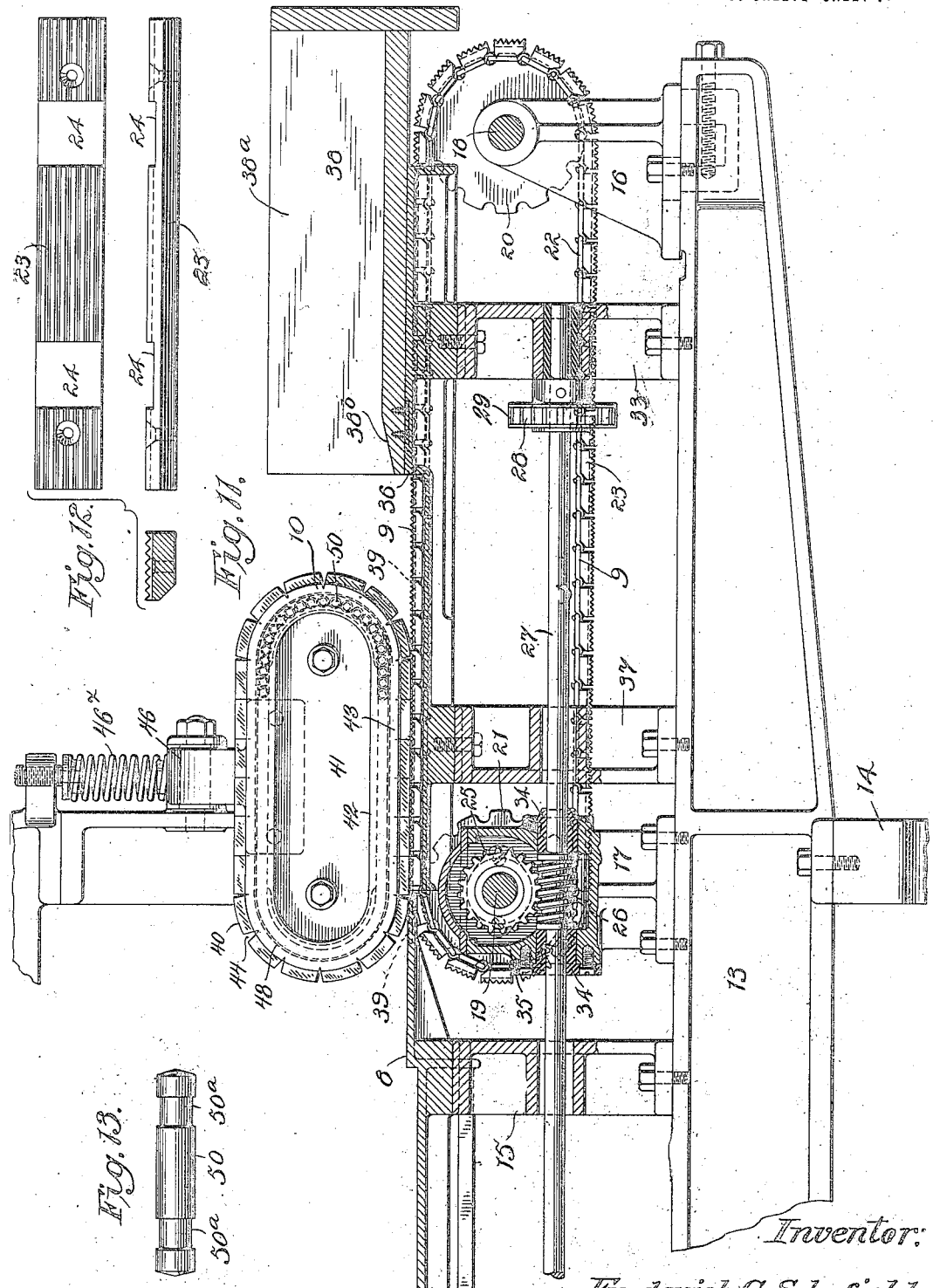

F. C. SCHOFIELD.
TOBACCO STEMMING MACHINE.
APPLICATION FILED AUG. 2, 1915.
1,268,392.
Patented June 4, 1918.
10 SHEETS—SHEET 8.
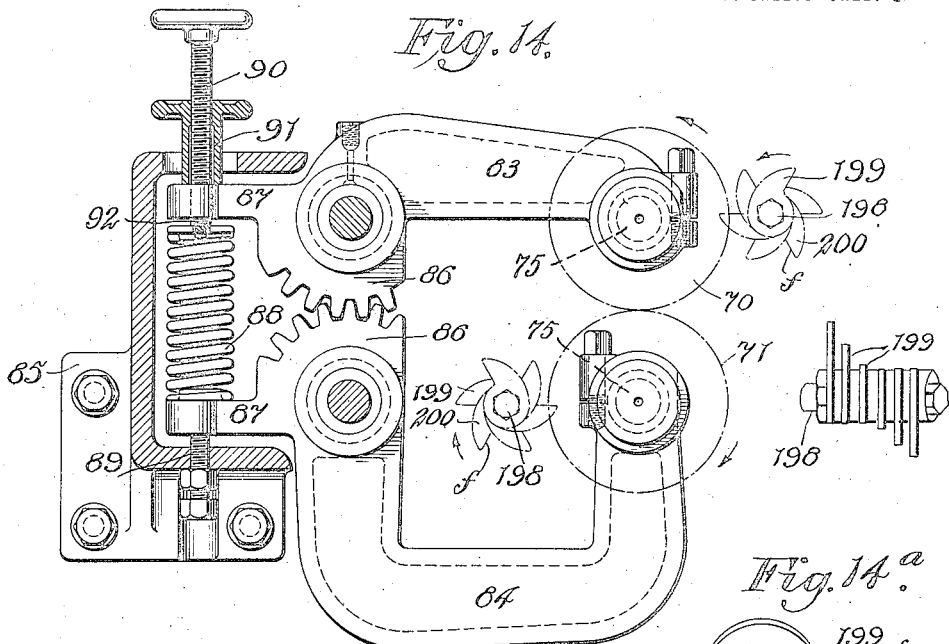
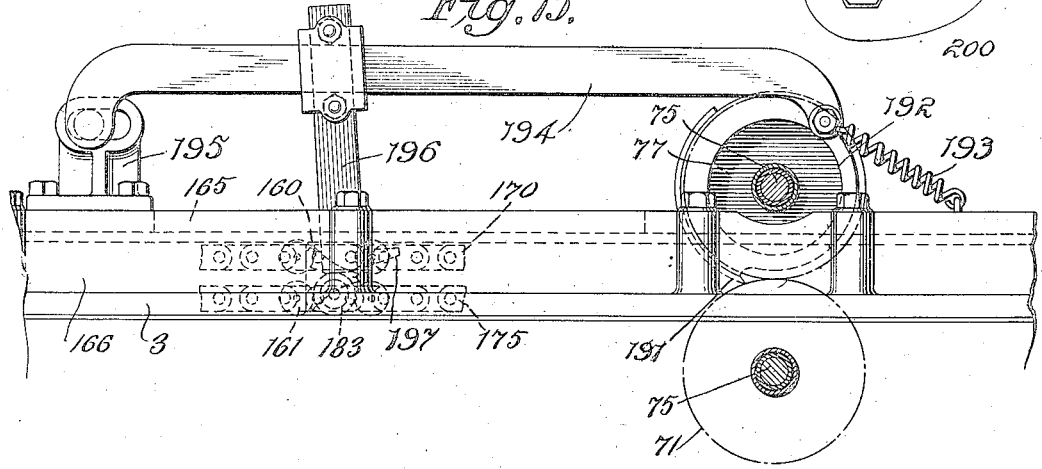
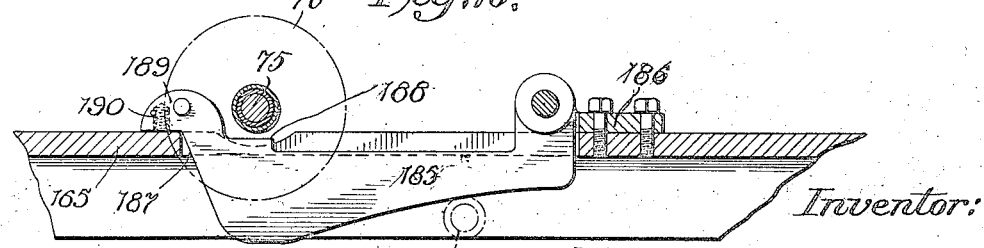
Inventor:
Frederick C. Schofield,
by Spear Middleton Donaldson & Spear
Attys.

F. C. SCHOFIELD.
TOBACCO STEMMING MACHINE.
APPLICATION FILED AUG. 2, 1915.
1,268,392.
Patented June 4, 1918.
10 SHEETS—SHEET 9.
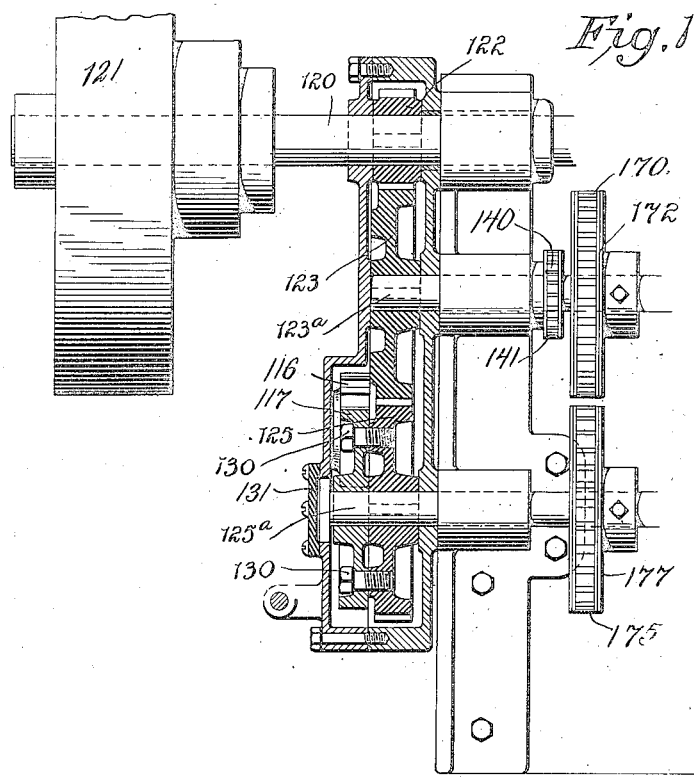
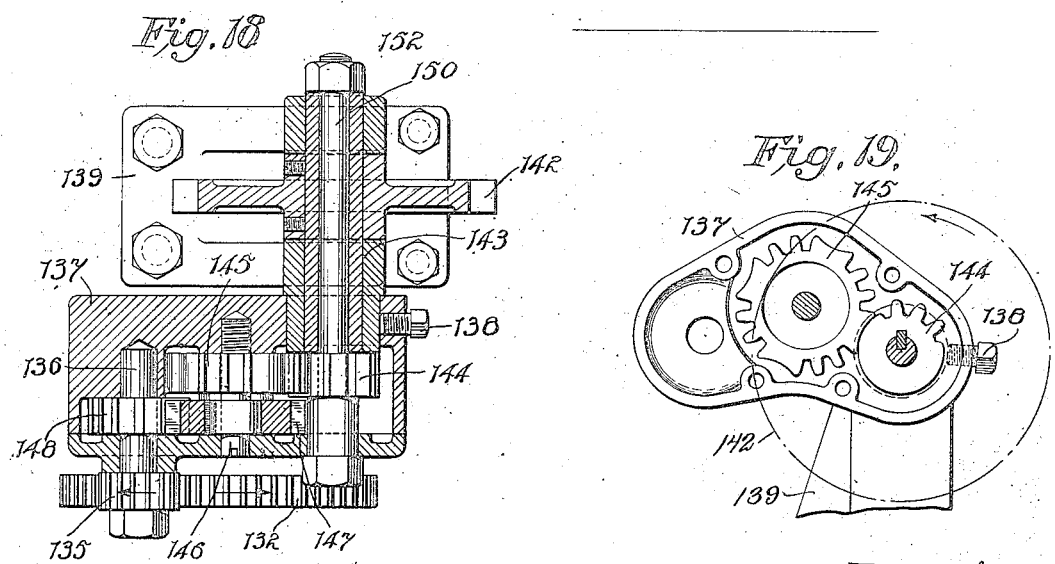

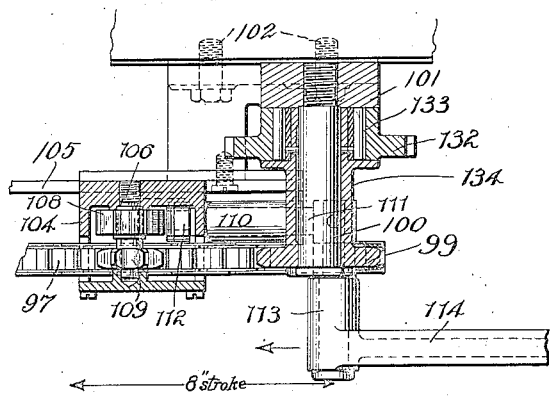
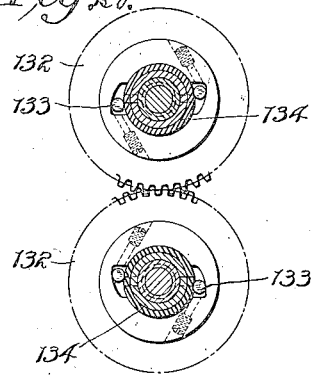
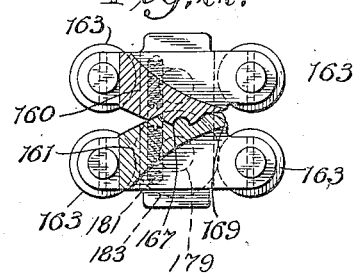
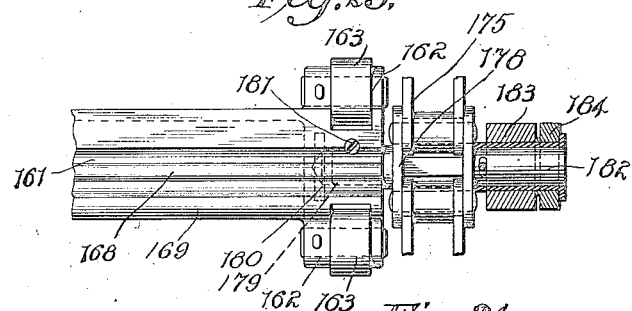
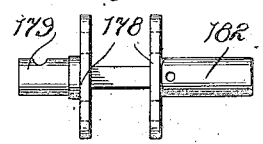
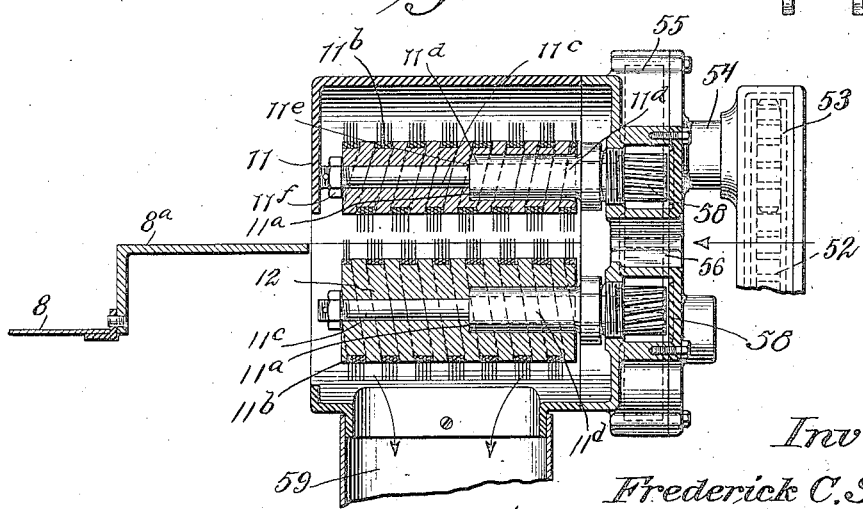

UNITED STATES PATENT OFFICE.

FREDERICK C. SCHOFIELD, OF WASHINGTON, DISTRICT OF COLUMBIA, ASSIGNOR TO THE TOBACCO STEMMING MACHINE COMPANY, OF BALTIMORE, MARYLAND, A CORPORATION OF DELAWARE.

TOBACCO-STEMMING MACHINE.

1,268,392.

Specification of Letters Patent.  Patented June 4, 1918.

Application filed August 2, 1915. Serial No. 43,227.

*To all whom it may concern:*

Be it known that I, FREDERICK C. SCHOFIELD, citizen of the United States, residing at Washington, District of Columbia, have invented certain new and useful Improvements in Tobacco-Stemming Machines, of which the following is a specification.

This invention is a machine for removing from tobacco leaves the main stems thereof, or such portions thereof as may be desired, of the type wherein the stripping mechanism acts upon a group of leaves or acts simultaneously upon a plurality of leaves.

The object of the invention is to provide a machine which is durable in construction, will require a minimum of manual labor for operating it, will stem without injury a high percentage of the leaves fed thereto, and will do the work with great rapidity.

The invention includes the parts and combination and arrangement of parts to be hereinafter described and particularly pointed out in the claims.

One embodiment of the invention is incorporated in the machine hereinafter particularly described and illustrated in the annexed drawings, wherein—

Figure 1 is a side elevation of the machine;

Fig. 2 is a plan view thereof;

Figure 10:
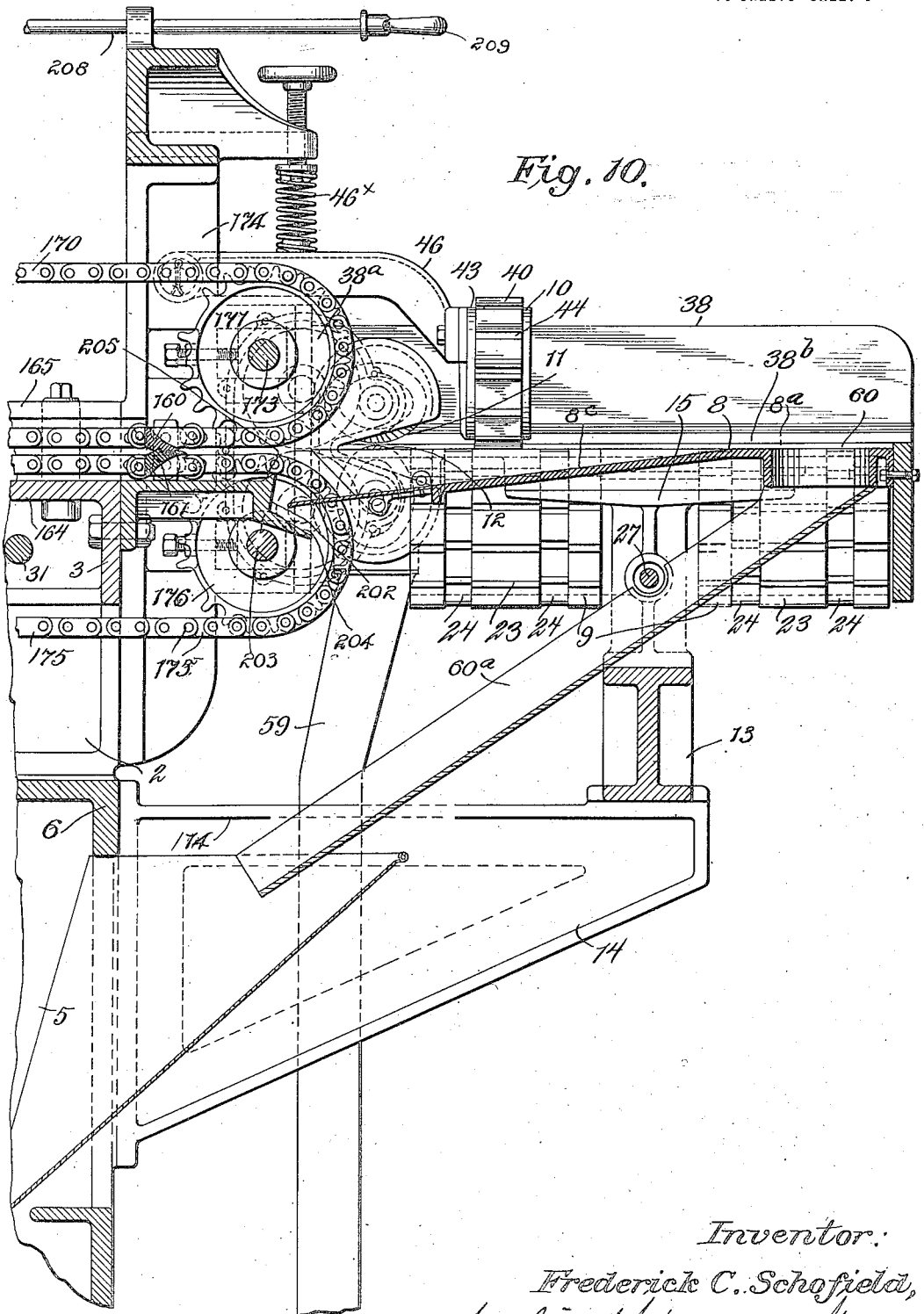

Fig. 2ª is a view of the stripping rolls with the stem cutter, clearer blades, and beater for removing broken leaf portions, in proper relation to said rolls.

Fig. 3 is a side elevation of a portion of the machine, the side illustrated being the opposite to that shown in Fig. 1;

Fig. 4 is an elevation with parts in section taken about the line 4—4, Fig. 2;

Fig. 5 is a detail sectional view of a portion of the "binder" and associated parts of the initial leaf-conveying mechanism;

Fig. 6 is a transverse sectional view of the machine about on the line 6—6, Fig. 2.

Fig. 7 shows in end elevation and longitudinal transverse section one of the stripping rolls of the second set.

Fig. 8 is a bottom plan view of one of the sectors or sections of the shell of said roll;

Fig. 9 is an end elevation of one of the end plates of the roll;

Fig. 10 is a detail sectional view about on the line 10—10, Fig. 2;

Fig. 11 is a detail vertical sectional view about on the line $11^x$—$11^x$, Fig. 2;

Fig. 12 shows in plan edge elevation and transverse sectional elevation one of the slats of the conveyer of the initial leaf stripping mechanism;

Fig. 13 is a detail view of one of the anti-friction rollers of the "binder";

Fig. 14 is a detail view of the arms carrying the stripping rolls of the second stripping mechanism and associated parts;

Fig. 14ª is a detail perspective view of one of the cleaner blades.

Fig. 15 is a detail view of the stem cutting knife and operated parts therefor;

Fig. 16 is a detail view of one of the lifting arms for the uppermost stripping roll of the second stripping mechanism;

Fig. 17 is a detail view of the transmission mechanism associated with the main drive shaft;

Fig. 18 is a detail sectional view of the transmission mechanism utilized for imparting a slow rotation to the stripping rolls of the second stripping mechanism during the stripping action;

Fig. 19 is a detail view of a part of the last named transmission mechanism;

Fig. 20 is a detail view of a part of the mechanism for giving the last named stripping rolls an accelerated rotation or "clearing" movement.

Fig. 21 is a detail view of gears and means for mounting the same in the train of mechanism employed for imparting said slow rotation to the stripping rolls;

Fig. 22 is a transverse sectional view of companion leaf-gripping bars;

Fig. 23 is a plan view of the lower of said companion bars, the parts being shown in section;

Fig. 24 is a plan view of the link connected to one end of the last named bar;

Fig. 25 is a detail view of the stripping rolls and associated mechanism of the first stripping mechanism.

The operative parts of the machine are supported by a suitable frame which, in the illustrated exemplification of my invention, includes a substantially rectangular bed 3 comprising spaced-apart side bars 1, 2, having inwardly extending flanges 164, 164ª, and end bars 3ª defining with said flanges a central opening, beneath which is arranged chutes 5, 5.

At opposite ends the bed is supported upon standards 6, 7, each including a cross bar and legs extending therefrom at opposite ends of the same.

In the illustrated machine the leaf blades are stripped from the stems in two separate operations and at separated stations. At the first station the portions of the blades adhering to the butt portions of the stems are removed, and at the second station the remaining portions of the blades, or such portions thereof as may be desired, are stripped from the stems.

Each stripping mechanism includes a pair of stripping rolls and a leaf carrier, or feed mechanism, for carrying the leaves between the stripping rolls; the initial leaf-carrying mechanism also discharging the partially stripped leaves upon a main feed table designated 8, where the leaves are directed into the path of the second leaf-conveying mechanism, preferably manually.

Preferably duplicate initial stripping mechanisms are employed in my machine, arranged at each side of the table 8, and it will be necessary, in order that the invention may be clearly understood, to refer, for the most part, only to one of these mechanisms.

The initial mechanism is so constructed and arranged that the leaf blades are fed in a direction lengthwise of the axes of the stripping rolls, while the second stripping mechanism is so constructed and arranged that the leaf blades are fed in a direction transverse to the axes of the stripping rolls.

The initial stripping mechanism includes an endless conveyer 9 (Figs. 2 and 11), a coacting conveyer, or binder, 10, and two stripping rolls 11, 12, between which the portions of the leaves to be stripped are carried by the conveyer and binder.

As shown herein, the two conveyers 9 and associated parts are supported upon a truss bar 13 located at the front of the machine, which is supported, adjacent its ends, upon supporting brackets 14 bolted to and extending laterally from the legs of the front standard 6. The bar 13 also supports the main feed table 8 by means of brackets 15.

Brackets 16, 17, bolted to the bar 13, support shafts 18, 19, carrying sprocket wheels 20, 21, engaging sprocket chains 22 forming portions of the conveyer 9. The chains 22 are shown as formed of a plurality of detachable links, and each link carries a wooden slat 23 (Fig. 12) having a serrated upper face, and spaced-apart recesses 24 in its face.

The sprocket wheels 20 turn freely on the shaft 18, but the complemental sprocket wheels 21 are fast on the shaft 19, which has fixedly secured thereto a worm wheel 25 meshing with a worm 26 fixed to a shaft 27 having also fixed thereto a drive sprocket 28 driven by a sprocket chain 29 engaging a sprocket wheel 30 fixed to a shaft 31 driven from the main drive shaft of the machine through a counter shaft 32 (Fig. 2), as will be hereinafter described. The shaft 27 is journaled at its ends in brackets 33 bolted to the bar 13, and adjacent the worm 26 this shaft is journaled in bearing sleeves 34 removably held in the bracket 17. The latter is provided with an upper section 35 providing a housing for the worm wheel 25.

Associated with the conveyer 9 is a table 36 supported upon the bracket 33 and a companion bracket 37. The upper face of the table is provided with channels $36^x$, Fig. 4, for accommodating the chains 22, and with surfaces on opposite sides of the channels for supporting the slats 23.

A leaf receiving and feeding receptacle 38 is fixedly secured to the table 36 at the outer end thereof, and includes a vertically extending alining wall $38^a$ and a flat bottom provided at the open end of the receptacle adjacent the binder 10 with a beveled face $38^b$.

A series of metal strips 39 extend lengthwise of the table 36 slightly below the face of the slats 23 of the upper run of the conveyer 9, these strips being supported at corresponding ends by the table 8, and at their opposite ends by the table 36, and act for bridging the space between the two tables, so as to prevent the conveyer 9 from carrying any of the leaves through the space between the adjacent edges of the tables, and for insuring the discharge of all the leaves advanced by the conveyer 9 and binder 10 upon the face of the table 8. The strips 39 are disposed in alinement with the recesses 24 in the slats 23 and occupy the channels formed thereby in the slats of the upper run of the conveyer 9.

The coacting conveyer, or binder, 10 is mounted above the portion of the conveyer 9 directly in advance of the initial stripping rolls 11, 12, (Figs. 2, 10 and 11), and its lower run is yieldingly pressed toward the coacting run of the conveyer 9. As herein shown, the binder includes an endless contacting member, or belt, 40 made of a suitable yielding material, as rubber, and a canvas backing, and having its yielding, or rubber, portion provided with a series of transverse slits for facilitating the movement of the same around the end of the track or guide to be described. The binder moves about a suitable guide or track of oblong form having substantially semicircular ends. As shown, this track is provided by a casting having a body plate 41, a rim 42 which forms the track proper, an outwardly extending flange 43 at the edge of the rim remote from the body plate, and a backing plate secured to plate 41 and providing a flange above the rim 42 corresponding to the rim 43, the backing plate being bolted to the free end of an arm 46 pivotally mounted on an upright standard 47 secured to the bed 3. The longer sides of the rim 42 are parallel to the upper run of the conveyer 9, and the semicircular ends of the rim are provided with peripheral spaced-apart channels 44. The binder is yielding to varying thickness of material passing under it and one form of support which may be employed for this purpose is the pivoted arm 46 and the spring 46$^x$ Fig. 4.

Suitable anti-friction means are interposed between the inner face of the belt and the track. As shown, this means comprises a metal band 48 arranged in a plurality of coils and having its ends free, with the outside end extending in the direction of the travel of the belt, and a series of rollers 50 located between the inner convolution of the band and rim. These rolls contact peripherally with one another, and are each provided with peripheral grooves 50$^a$, Fig. 13, corresponding to the high portions between the channels of the semi-circular portions of the track, so that as the rolls pass around said semicircular portions, contact with the track will be made only between the portions of the latter between the channels, or the high portions, and the bottom walls of the grooves 50$^a$. The rolls 11, 12, are preferably elliptical in cross section, and are so set that in one position of the rolls the major transverse axis of one is disposed substantially at right angles to the corresponding axis of the other, and in all positions of the rolls the major axes are at an angle to each other. The rolls are duplicates of each other, save that the coils of card clothing of one and the channel receiving the same are reverse to that of the other, see Fig. 25. Each roll preferably includes a barrel or drum provided with a bore having portions of unequal diameters between which a shoulder 11$^a$ is formed, and a periphery provided with a wide channel 11$^b$ extending spirally thereof, and with its convolutions separated from one another material distances. A strip of card clothing forms a part of each roll, the body portion of which is retained in the channel 11$^b$, and the teeth of which are relatively heavy and extend outwardly. Each drum is connected to a shaft 11$^c$ journaled in a fixed bearing 11$^d$ and having a shoulder 11$^e$ coöperating with the shoulder 11$^a$, and having a threaded end for receiving a nut 11$^f$ which, when screwed home, securely clamps the roll to the shaft. The opposite end of the shaft carries the pinion 58 which is shown (Fig. 25) as a helical gear.

As will be noted, all of this mechanism is incased.

The rolls 11, 12, are driven at a high speed from the shaft 31, Fig. 2, through sprocket chain 52, sprocket wheel 53, shaft 54, carrying the same, gear 55 on said shaft, companion gear 56 on shaft 57, Fig. 4, and the pinions 58 on the shafts of said rolls 11, 12, as described.

The operation of the initial stripping mechanism is substantially as follows:

An operator standing at the front of the machine about in line with the inner edge of the receptacle 38 takes a bunch or "hand" of leaves and disengages the tie leaf holding the same, and spreads the leaves along the bottom of the receptacle, alining the same by pressing the butt ends thereof against the rear wall 38$^a$ of such receptacle. He then moves the leaves along the bottom of the box over the beveled edge 38$^b$ thereof onto the conveyer 9, and under the binder 10. The conveyer and binder then carry the leaves between the rolls 11, 12, and the portions of the blades of the leaves adjacent the butt ends of the stems are stripped or wiped from the stems and discharged into a receiving chute 59, and the leaves are finally discharged upon the adjacent surface of the main feed table 8.

When a duplicate initial stripping mechanism is employed, as in the illustrated machine, an additional operator is employed for feeding the same, and under such conditions tobacco leaves partially stripped are received at opposite sides of the main feed table 8.

An independent operator preferably feeds the second stripping mechanism, such operator standing directly in front of the table 8, and as the leaves are discharged from the initial stripping mechanism as described, the operator standing at the main feed table 8 directs any leaves with broken stems through the opening 60, Fig. 2, from which leads chute 60$^a$, Fig. 10, and he advances the remaining leaves lengthwise of the feed table 8, spreading the same out transversely thereof, so that a transverse row of leaves will be grasped by the carrier of the second stripping mechanism, as will be hereinafter described.

The stripping rolls of the second stripping mechanism, designated 70, 71, are arranged one above the other, and extend in a direction transversely across the bed 3 above the opening 5 therein. Each roll is provided with a plurality of peripheral teeth which preferably incline rearwardly in reference to the direction of rotation of the roll from a radial plane intersecting the axis of the roll and the base of the tooth. Each roll is preferably formed of a strip of card clothing spirally wound upon an expansible sectional shell 72 formed of a plurality of segments each provided internally with a series of double inclined ribs 73, each of the ribs tapering from its middle toward its end. These ribs rest upon the peripheries of two truncated conical expanders 74, located in the bore of the shell, with their ends of smaller diameter innermost. The shells are preferably splined to the shaft of the rolls with which they are associated. Keyed to this shaft are head plates 76, 77, each provided with an opening for the shank of a nut 78, and each having, on its outer face, means for detachably engaging an end of the card clothing strip. This engaging means is here shown as segmental lugs 79, 80, (Fig. 9), the latter having sockets therein, and the companion lug carrying pointed screws 81 registering with the sockets. The end of the strip of card clothing is introduced between the lugs and held firmly in place by the screw.

The tube formed by the spiral strip of card clothing is firmly supported by the shell, and any stretch in the card clothing is compensated for by expanding the shell by means for shifting the expanding truncated cones toward the middle of the roll. This means is here shown as a bolt 82 associated with each cone having one end secured in the web thereof, and its opposite end engaged by the nut 78 associated with the head 76 or 77 at the opposite end of the roll. By adjusting the nut the associated cone is moved lengthwise of the roll.

Means are provided for yieldingly pressing the two rolls toward each other, for balancing the rolls against each other and for permitting of the rolls moving simultaneously away from each other so as to permit of the passage of the gripping bars of the leaf conveyer to be hereinafter described to pass between the rolls without injuring the teeth thereof. As shown, this means includes companion levers 83, 84, at opposite ends of the rolls 70, 71, pivoted at corresponding ends in brackets 85 bolted to the sides of the bed 3, and carrying the rolls at their free ends. Companion levers are provided with intermeshing gear sections 86, and with radially extending tails 87 between which a helical spring 88 is located. The springs 88 tend to force the rolls 70, 71, toward each other, and the extent of this movement is determined by adjustable stop pins 89 threaded in the brackets 85. The tension of each spring 88 is adjusted by a screw 90 mounted in one of the tails 87, and held in adjusted position by a lock nut 91. For indicating the adjustment so as to obtain equal pressure at opposite ends of the roll, a pointer 92, Fig. 3, is preferably associated with each screw 90, the end of which coöperates with a scale 93 on the outer face of the adjacent bracket 85.

For rotating the rolls 70, 71, in the directions indicated by the arrows 94, 95 (Fig. 3), the shafts 75 carry sprocket wheels 96 engaged by sprocket chains 97, 98, passing over sprocket wheels 99 carried by the stud shafts 100 journaled in a bracket 101 adjustably secured to the bed plate 2 by bolts 102 passing through slots in the bracket. A pin 103 having a head coacting with the adjacent bracket 85 is provided for holding the bracket 101 against accidental movement toward the rolls 70, 71. This means enables any slack to be taken out of the chains 97, 98.

The illustrated machine is constructed so that the rolls 70, 71, may be held stationary during their stripping action, or they may be given a slow, continuous movement during the stripping action, or they may be given an intermittent movement, so that they will be held stationary during a portion of the stripping action, and will rotate during another portion of the stripping action; but upon the completion of the stripping action, they are given a rapid partial rotation in the direction of the stripping rotation, if such rotation takes place, and at an accelerated speed, for the purpose of clearing the rolls from the stripped blades or discharging the stripped blades. In the illustrated machine the means for effecting this clearing or partial rotation of the rolls is the same whether the rolls are held stationary during the stripping action or are given a rotary movement, and includes a casing or bearing member 104 sliding on a fixed guide rod 105 bolted at its ends to the bracket 101 and adjacent bracket 85. Shafts 106, 107 (Fig. 20) are journaled in the casing 104, and carry respectively ratchet and sprocket wheels 108, 109. The sprocket wheels 108 engage respectively with the lower run of the sprocket chain 97 and the upper run of the sprocket chain 98. A hub 110 projects from one wall of the casing 104 for providing, with a registering opening in said wall, a guide for a pin 111 carrying within the casing a double detent 112 for coöperating with the ratchet wheels 108, and having a head at its opposite end for coöperating with the end of the hub, and also having a transversely extending hole for receiving a stud 113, which connects the head to the forward end of a pitman 114 connected at its opposite end to one member of a double crank carried by a shaft 115 having keyed thereto a mutilated pinion 116 meshing with a mutilated gear 117 adjustably connected to the face of a gear wheel 125 (Fig. 17) mounted on a shaft 125$^a$, and meshing with a gear 123 mounted on a shaft 123$^a$, the last named gear being driven by a pinion 122 associated with the main drive shaft 120.

A slight lost motion is provided between the pin 111 and the casing 104, so that the pin may have sufficient movement independent of the casing for engaging and disengaging the double detent from the ratchets 109. Assuming the parts to be in the position shown in Fig. 3, in the initial part of the travel of the pitman 114 toward the rolls 70, 71, the pin 111 will be shifted independently of the casing 104 for engaging the detents with the ratchet, and in the remaining portion of the movement of the pitman toward the rolls the casing 104 will be moved, and during this movement, as the gears 109 will be locked against rotation through the locking of the ratchets 108 by the detents, the adjacent runs of chains 97, 98, will move with the casing, and will impart a rapid movement of rotation to the rolls 70, 71. At the commencement of the return stroke of the pitman 114, the detent 112 will be disengaged from the ratchet, and in the further movement of the pitman the casing 104 will be carried back to its initial position, but, as the sprockets 109 have been freed so that they may rotate freely, no movement will be imparted to the chains 97, 98.

The illustrated means for driving the pitman 114 admits of adjustment in the timing of this movement in reference to the movement of the leaf-carrying bars to be hereinafter described, through the adjustment of the mutilated gear 117, about the axis of the gear 125 carrying the same. For effecting this adjustment the last-named gear is provided with a series of openings concentric to its axis, and the mutilated gear 117 carries bolts 130 for engaging with selected pairs of these openings.

The double crank shaft described includes a crank swiveled upon the crank shaft 115 having one end connected to the pitman 114, and its opposite end provided with a yoke 126 carrying buffers 127, and a second crank 128 keyed to the shaft 115 and having a free end extending between the adjacent ends of the buffers. The described transmission mechanism gives the pitman 114 an intermittent movement, that is, a movement with a dwell between each rotation of the crank-shaft 115 of substantially 180°, and such dwell occurs when the crank is off the dead center. The double crank with interposed buffers serves for effectually relieving the mechanism of sudden jars, which would otherwise occur at the commencement of each impulse imparted to the crank shaft.

As shown, the gearing described is all incased, and for giving ready access to the gear 117 so that it may be adjusted in respect to the gear 125, the wall of the inclosing casing in front thereof is provided with a large opening normally closed by a removable plate 131.

The illustrated means for rotating the rolls 70, 71, either continuously or intermittently during the leaf-stripping action comprises companion intermeshing gears 132 each having a clutch connection 133 (Figs. 3, 20 and 21) to a sleeve 134 integral with the adjacent sprocket 99, so that such sprocket may rotate independently of the gear during the movement of the chain 97 or 98 by the described mechanism for imparting the clearing rotative movement to the rolls. A drive pinion 135 meshing with the upper of the two gears 132 (Figs. 18, 19) is carried by a stub shaft 136 journaled in a casing 137 held by a binding screw 138 in the desired adjusted position on a supporting boss extending laterally from the upright standards of a bracket 139 bolted to the bed plate 2 of the machine. This adjustment permits of the proper mesh being obtained between the pinion 135 and the associated gear 132, and of the use of pinions of different diameters. The shaft 136 is driven from the shaft 124 either continuously or intermittently. An intermittent transmission mechanism is here illustrated, and it comprises a sprocket wheel 140 on the shaft 124, a sprocket chain 141 associated therewith, and with a sprocket wheel 142 fixed to a bearing sleeve 143 journaled in the upright standards of the bracket 139. The rotation of the sleeve 143 is imparted to the shaft 136 through a train of gearing, including a detachable clutch. The gearing includes a mutilated gear 144 keyed to a shaft 150 extending axially through the sleeve 143, and designed to be coupled thereto or uncoupled therefrom by adjusting a nut 152 on the outer end of the shaft, the gear 144 meshing with a companion mutilated gear 145 carried by a shaft 146, said gear 145 carrying a pinion 147 meshing with a pinion 148 fixed to the shaft 146.

As is obvious, continuous or unmutilated gears can be readily substituted for the mutilated gears 144, 145, should it be desired to impart a continuous rotation to the drive gear 135, and to the rolls 70, 71, through the means driven from the gear 135.

When it is not desired to impart a rotary movement to the rolls 70, 71, during the stripping action thereof, it is merely necessary to loosen the nut 152, and thereupon the sleeve 143 will not impart any movement of rotation to the shaft 150 or mutilated gear 144 keyed thereto.

In the illustrated machine, a group of leaves or plurality of the same are simultaneously carried from the feed table 8 to and between the rolls 70, 71, where the blades are stripped from the stems and discharged, and the stripped stems are carried onwardly and discharged at the rear end of the machine. For this purpose a suitable carrier is provided, including companion leaf-gripping bars (Figs. 22, 23); each upper bar being designated 160 herein, and its companion lower bar 161. Each bar extends transversely of the length of the machine, or parallel to the axes of the rolls 70, 71, and is in the form of a truck, comprising a main body, and laterally extending lugs at opposite ends, in which are mounted rolls 163 running in contact with rails on the frame of the machine throughout the major portion of the travel of the bars during the gripping action thereof. The rails for the rollers associated with the bars 161 are formed on inwardly extending flanges 164 at the upper edges of the side rails of the bed 3, and the tracks for the rollers of the bars 160 are formed on inwardly extending flanges 165 of side rails 166 bolted to the top of the bed 3 at opposite sides thereof. Removable space plates 167 are preferably located between contiguous faces of the rails 166, and the side rail of the bed, which plates are adapted to be removed for compensating for any wear of the rolls 163 or the tracks upon which they run. Companion bars are provided with irregular or complemental grooved gripping faces 168, and such faces, adjacent the rear edges of the bars, diverge from each other, or are beveled outwardly, as shown at 169, so as to avoid sharp edges which might break the tobacco stems should the portions thereof projecting from the bars be shifted to one side or the other of the path of travel of the bars when in gripping coaction. The bars 160 at opposite ends are connected to companion sprocket chains 170 located respectively at opposite sides of the machine, and passing around sprocket wheels 171, 172. The sprocket wheel 171, Fig. 10, is journaled upon a shaft 173 adjustably mounted, for taking up any slack in the chain, in bearings provided in vertical standards 174 secured to the end of the bed, and the sprocket wheel 172 is fixed to the shaft 123ª, Fig. 17, and acts for driving the chain. The bars 161 are connected in a similar way to a sprocket chain 175 engaging sprocket wheels 176, 177. The wheel 176 is a duplicate of wheel 171, and is adjustably mounted in the same manner thereas, and the sprocket wheel 177 is a substantial duplicate of the wheel 172, and is fixed to the shaft 125ª and acts for driving the chain 175. The connection between the ends of each bar and the adjacent chain carrying the same is obtained, in the illustrated embodiment of my invention, by a link 178 forming a part of the chain, and including side plates, from the inner of which extends a pin 179, Figs. 23 and 24, which is held by a pin 181 in an axial socket in the adjacent end of the bar so as to permit of limited rocking of the latter. A pin 182 extends outwardly from the outer plate associated with each end of each of the bars 160, and provides a journal for rollers 183, 184, the former of which comes into contact with the inclined under edge of a lifting arm 185, Fig. 16, provided for lifting the upper roller 70, the movement of which is transmitted through the described gears 86 to the companion roller 71 for separating the rolls to admit of the passage of the gripping bars without injuring the teeth of the roll. During the engagement of the roll 183 with the lifting arm 185, the roller 184 rides upon the track of the adjacent flange 164. A lifting arm 185 is provided at each side of the machine, being mounted in a bracket 186 secured to the bed, and working through an opening 187 in the adjacent flange 165. Each arm is provided with a part 188 for engaging the adjacent portion of the shaft of the roll 70, and with a nose 189 for resting on top of the rail and limiting the downward movement of the free end of the arm. A spring 190 is preferably located in the nose for cushioning the contact thereof with the rail upon the dropping of the arm after the passage of the roll 83 from contact with the lower side thereof.

In certain classes of tobacco leaves it may be desirable not to remove the entire stem, but to leave in the blade portion of the leaf the thin part of the stem near the tip of the leaf, and for severing the stem adjacent the tip so as to permit the aforesaid portion of the stem to remain with the blade of the leaf, the illustrated machine embodies a stem severing knife 191 Fig. 15 carried by plates 192 located at opposite ends of the roll 70 and journaled on the shaft thereof. The knife is held out of cutting position by springs 193 fastened at corresponding ends to the rail 165, and at the opposite ends to the plates 192. The knife is moved into position to sever the stems of the leaves against the tensions of the springs by means actuated by the rollers 183. This means is shown as a pair of arms 194, one at each side of the machine, connected at corresponding ends to the plates 192, and having sliding pivotal connections at their opposite ends to bracket 195 secured to the rails 165. A bar 196, adjustably supported on each arm 194, depends from the latter and is provided at its lower end with a toe 197 having an inclined under face for engagement by the roller 183 moving in registration therewith. Upon the rollers 183 contacting with the inclined under faces of the toes 197, the bars 196 are carried leftward, Fig. 15, drawing upon the arms 194 for swinging the plates 192 for carrying the cutting edge of the knife 191 into engagement with the stems of the leaves to cut the same therefrom. In the leftward movement of the bars 194 they rise at their right-hand ends, and thus their toes 197 are lifted above the rollers 183 for the return of the cutting mechanism to normal position under the action of the springs 193. It will be understood that the leaf blade collects at the right of the rolls 70, 71 in Fig. 15 and only the stem passes through the rolls and that the knife cuts this stem at the left of the rolls. Therefore that portion of the stem lying to the right of the knife remains attached to the leaf blade.

Means is associated with each of the stripping rollers 70, 71, for clearing the teeth thereof of adhering particles of the tobacco leaves. As shown, the means associated with each roll comprises a shaft 198 spaced from the associated roll, and driven at a high speed from the shaft 32, and carrying a series of thin steel blades 199 spaced apart from each other lengthwise of the shaft by elastic washers, and preferably of the form shown in Fig. 14$^a$. These blades are formed of tempered steel, approximately five-thousandths of an inch in thickness, and having such flexibility as to readily bend laterally in a direction parallel to the axis of the shaft carrying the same. Instead of arranging the blades equal distances apart, they may be arranged in groups of three, with suitable interposed separators between the groups. It will be noticed from Fig. 14$^a$ that the blades are of a shape defined by one edge being radially disposed and extending from a concentric hub portion which merges into the eccentric curved portion 200, the edge of which joins the radial edge. The clearing rolls rotate constantly in the direction indicated by the arrows, Figs. 14, 14$^a$, bringing the eccentric edges $f$ into engagement with the stripping teeth of the adjacent stripping rollers, thus securing a wiping action which effectually removes any particles of stem or leaf which may be lodged between the teeth of the last named rolls, so that such particles will be dislodged at once, or loosened to such an extent that they will be discharged when the stripping rolls are given their quick, rotary, clearing movement hereinbefore described.

The distance between the adjacent blades is about three-thirty-seconds of an inch, and the blades intermesh with the teeth of the adjacent stripping roll from three-eighths to five-eighths of an inch.

The main feeding table is provided with flat substantially horizontally disposed leaf-receiving surfaces 8$^a$ at opposite sides thereof, and a flat downwardly inclined feeding board of surface 8$^c$ terminating slightly to the rear of a vertical plane intersecting the axes of the sprocket wheels 171, 176, and below the path of movement of the companion gripping bars 160, 161, when in leaf-gripping position, and adjacent a substantially vertical or undercut fixed stop surface 202 formed by the front wall of a bracket 203 bolted to the front end of the bed 3 and having an upper surface forming a continuation of the rails 164. A surface 204 of the bracket extends downwardly and forwardly at an angle from the bottom of the stop surface 202. The surface 202 extends slightly above the top of the upper surface of the bracket 203, and is connected therewith by an inclined surface 205. Preferably the rear edge of the feed board 8$^c$ extends into close proximity to the stop surface 202, as shown in the machine illustrated, and in order to permit of the passage of the bars 161 a section of this feed board adjacent its rear end is pivotally connected to the major portion thereof, so that such pivoted section may swing upwardly to permit of the passage of the bars 161 as they are carried around the sprocket wheel 176. By terminating the table at one side of the path of movement of the bars 161 this movable section may be dispensed with. The movable section, however, not only serves to bridge the space, which would otherwise be located between the path of movement of the bars 161 as they round the sprocket wheel 176 and the stop surface 202, into which the butts of some of the leaves might enter, but as it is raised by the bars 161 said section serves as an indicator to the operator feeding the leaves along the feed board for notifying him that companion bars are about to come into gripping position, so that he will move his hands out of the way of such bars if, in advancing the leaves, he has advanced his hands to such a position that they might be caught between the bars.

A suitable clutch is interposed between the main drive pulley 121 and the gear 122, the movable member of which is manually shifted by means of a vertical lever 206 pivotally supported at its lower end and having pins 207 for engaging flanges on the movable clutch member. The lever 206 is operated manually through a link 208 having its end adjacent the feed end of the machine provided with a hand engaging portion 209, and its other end connected to one arm of a bell crank lever 210, the other arm of which is connected by a link 211 to the upper end of the lever 206.

For knocking off of the bars 160, 161, any particles of the tobacco stems or leaves which may adhere thereto, a plurality of series of depending chains 213 are provided which extend in the path of movement of such bars.

For preventing the stripped leaves or stems from accumulating on the upper edges of the hoppers 5, 5, suitable pivoted flaps 214 are mounted in the base 3, and extend transversely of the machine above the edges of the hoppers. The upper ends of these flaps project into the path of movement of the bars 161 carried by the lower run of the chains 98, and are tilted by the bars for throwing into the hoppers any leaf blades or stems which may accumulate on the upper edges of the flaps. Springs 214ª, Fig. 6, tend to hold the flaps in upright positions.

The counter shaft 32 is driven from the main shaft 120 by interposed gearing designated 215, and illustrated in Fig. 2.

For combing out such of the ends of the group of leaves being carried by the bars 160, 161, as may be entwined or entangled with each other, a comb 219, Figs. 1 and 2, having teeth 219ª extends transversely across the machine in the path of said bars during the leaf-carrying movement of the same. This comb is suitably pivoted at 220 between the sides of the bed 3 and a spring 221 tends to hold it in upright position.

The operation of this part of the mechanism is substantially as follows: The leaves having the portion of the blades adjacent the butts removed therefrom having been discharged upon the receiving surfaces 8ª of the main feed table 8, the operator standing at said table places his hands upon the same, and spreads them upon the feed board, and advances the leaves toward the stripping rolls 70, 71, until the butt ends of the leaves are alined against the stop surface 202. In the movement of the chain 175 a gripping bar 161 comes beneath the series of leaves so positioned, and lifts the butt ends thereof above and free of the stop surface 202, and at this time the companion gripping bar 160 comes into registration with such bar 161, and the two bars grip the leaves between their complemental surfaces 168. In the continued movement of the sprocket chains 170—175, the bars 160, 161, gripping the plurality of leaves as aforesaid, carry the same to and between the rolls 70, 71. Just before the bars reach the latter the rollers 183 of the lower bars 161 engage with the inclined under surface of the member 185, and raise the same as described for separating the rolls 70, 71, and during such separation the bars 160, 161, pass between the same without injuring the teeth thereof. Immediately the bars pass beyond the vertical plane intersecting the axes of the rolls 70, 71, the latter come together again, and strip or wipe the blades from the leaves, and the bars, continuing their onward movement, discharge the stripped stems at the rear end of the machine. The blades removed from the stems are discharged forwardly from the rolls either immediately they are stripped from the stems or when the rolls are given the rapid clearing rotation before described.

It sometimes occurs that a leaf carried forward by the bars will have a broken stem, and for preventing the rear portion of such leaf with the stem unremoved therefrom falling into the chute or hopper designed for receiving the stemmed blades, means are provided for detaching the aforesaid portion of the leaf having the broken stem before it reaches the stripping rolls. As shown herein, this means comprises a beater 216 journaled between the sides of the bed 3, and including a shaft carrying a series of radially extending rigid blades 216ˣ, Fig. 2 and dotted lines Fig. 1. This shaft is given a very rapid rotation by means interposed between it and the counter drive shaft 32.

This beater operates below the path of movement of the perfect leaves, and although it may contact with the same, it acts to throw back only the depending ends of leaves having broken stems.

The front portion of the beater is shielded by a guard plate 217 which may be shifted about the axis of the beater for exposing a greater or less portion thereof, so that it will engage the depending leaf portions at slightly different points in reference to the rolls 70, 71.

The mutilated gears 144, 145, referred to, act through the interposed gearing leading to the rolls 70, 71, for locking the latter against rotation in a direction reverse to the direction indicated by the arrows 94, 95, under the pull of the tobacco leaves being drawn between the rolls during the stripping operation, and when continuous or unmutilated gears are substituted for the mutilated gears, a detent may be employed engaging one of the gears to prevent said reverse rotation under the pull of the leaves being stripped.

I claim:

1. In a tobacco stemming machine main stripping rolls to receive the tobacco leaves in groups, a conveyer to feed the leaves to said rolls in groups and in a direction transverse to the axis of said rolls, preliminary stripping means to clear the butts of the stems of leaf blade portions and a table intermediate the main conveyer and the preliminary stripping means for receiving the partially stemmed leaves from the preliminary stripping means, said preliminary stripping means acting upon the leaves substantially *seriatim* and feeding them toward and discharging them upon the intermediate table in a position substantially conforming to the position necessary for being taken by the first mentioned conveyer substantially as described.

2. In a tobacco stemming machine main stripping rolls to receive tobacco leaves in groups, a conveyer to feed the leaves to said rolls in groups, in a direction transverse to the axes of said rolls, preliminary stripping means to clear the butts of the leaf blade portions, and a table for receiving the partly stemmed leaves from the preliminary stripping means, said preliminary stripping means acting upon the leaves substantially *seriatim* and moving them toward and discharging them upon the intermediate table in a position substantially conforming to the position necessary for being taken by the first mentioned conveyer, said preliminary stripping means comprising a pair of stripping rolls arranged with their axes parallel with the axes of the main stripping rolls and having card clothing spirally mounted thereon which gives the leaves movement toward the intermediate table, and a conveyer for engaging the leaves and moving them in conjunction with the action of the preliminary stripping rolls substantially as described.

3. In a tobacco stemming machine main stripping rolls to receive the tobacco leaves in groups, a conveyer to feed the leaves to said rolls in groups and in a direction transverse to the axes of said rolls, preliminary stripping means to clear the butts of the stems of leaf blade portions, a conveyer operating in a direction substantially at right angles to the conveyer first mentioned, to carry the leaves substantially *seriatim* along the preliminary stripping toward the first mentioned conveyer, and a table for receiving the partly stemmed leaves from the preliminary stripping means and in a position substantially conforming to the position necessary for being taken by the first mentioned conveyer substantially as described.

4. In a tobacco stemming machine for stemming tobacco leaves in groups, and in combination, means at one station for removing portions of the leaf blades, and means at another station for simultaneously with the action just mentioned removing from the previously treated leaves other portions of the blades thereof, a main drive shaft, and means for actuating the two stemming mechanisms therefrom, each of said blade removing means including coacting stemming rolls and carrying means for the leaves acted upon thereby, the two sets of stemming rolls being disposed in substantially parallel relation to each other, and the leaf-carrying mechanism associated with one set of said rolls moving the leaves at substantially right angles to the direction in which the leaves are moved by the conveying mechanism associated with the other set of rolls.

5. In a tobacco stemming machine and in combination, a pair of stemming rolls, means for rotating the same, leaf conveying means for moving the leaves in a direction lengthwise of the rolls and with portions of the leaves projecting between the same, a feed table receiving the leaves from the conveyer after they have been acted upon by said stemming rolls, a pair of stemming rolls arranged in advance of the table, and leaf-conveying means for receiving a plurality of leaves from the table and for conveying the same to and between the last named rolls, the last named leaf-conveying means moving the leaves in a path transverse to the longer axes of said rolls.

6. In a tobacco stemming machine and in combination, a pair of rolls, means for moving the leaves in a direction lengthwise of the rolls with portions of the same projecting therebetween, comprising a conveyer and a binder coacting therewith, the conveyer including an endless chain, and wooden slats extending transversely in reference to the direction of movement of the chain.

7. In a tobacco stemming machine and in combination, companion stripping rolls, a leaf-conveyer associated therewith, and a supplemental conveyer or binder coacting with the first-named conveyer and including a member provided with an unyielding endless track, having curved end portions and an endless band of compressible material movable about said track, and anti-friction means between said band and track.

8. In a tobacco stemming machine and in combination, companion stripping rolls, a leaf-conveyer associated therewith, and a supplemental conveyer or binder coacting with the first-named conveyer and including a member provided with a track, an endless band of compressible material movable with the first-named conveyer, and anti-friction means between said band and track, said means comprising a flat metallic coil having free ends, said coil being on the inner side of the compressible band, and a series of roller bearings interposed between the coil and the track.

9. In a tobacco stemming machine and in combination, companion stripping rolls, a conveyer associated therewith, and a supplemental conveyer or binder coacting with the first named conveyer comprising an endless band of compressible material, a track member presenting an endless track surface including parallel portions, and semicircular end portions, the latter being provided with lengthwise extending channels, and anti-friction rollers interposed between the band and track, said rollers having peripheral channels complemental to the portions of the semicircular parts of the track between the channels therein.

10. In a tobacco stemming machine and in combination, companion stripping rolls, a leaf conveyer associated therewith, and a coacting supplemental conveyer or binder comprising a band formed of a backing, and a yielding or compressible facing secured to the backing, said facing being slitted transversely at intervals, a track for supporting and guiding the band, the track having parallel portions arranged substantially parallel to the face of the first-named conveyer, and semi-circular end portions, anti-friction means interposed between the track and the band, means for supporting the track, and means tending to press the same toward the first named conveyer.

11. In a tobacco stemming machine, final stripping rolls, a leaf carrier associated therewith, a main feed table, an initial leaf-stripping mechanism located at opposite sides thereof comprising a pair of stripping rolls, leaf feeding means, including an endless conveyer, a table associated with the conveyer and having an edge arranged adjacent the side edge of the main table, and metal strips carried by the two tables and bridging the space between the adjacent edges thereof, substantially as described.

12. In a tobacco stemming machine, stripping rolls, a leaf conveyer comprising a pair of chains, a series of wooden slats carried by said chains and extending transversely in reference to the direction of movement thereof, said slats having roughened upper faces to engage the tobacco leaves, and transverse recesses therein, and strips engaging said recesses and extending transversely of the slats, substantially as described.

13. In a tobacco stemming machine and in combination, a supporting bar, brackets mounted thereon, a conveyer supported by the brackets and including parallel companion sprocket chains with means for driving the same, and cross slats secured to the links of said chain, a main feed table, a table associated with the conveyer, the last-named table having channels for receiving the chains, slat supporting surfaces at opposite sides of the channels, and a leaf receiving receptacle carried by said table, substantially as described.

14. In a tobacco stemming machine and in combination, a supporting bar, brackets mounted thereon, a conveyer supported by the brackets and including parallel companion sprocket chains with means for driving the same, and cross slats secured to the links of said chain, a main feed table, a table associated with the conveyer, the last-named table having channels for receiving the chains, slat supporting surfaces at opposite sides of the channels, a leaf receiving receptacle carried by said table, and means for bridging the space between the adjacent edges of the two tables, substantially as described.

15. In a tobacco stemming machine and in combination, a pair of stripping rolls, leaf conveying means associated therewith and including an endless carrier having its leaf-engaging run located in advance of the rolls and moving in the direction of the longitudinal axes thereof, an endless supplemental conveyer or binder also located in advance of the rolls and having a part thereof directly in advance of the same running in parallelism with the leaf-engaging run of the first-named conveyer, and a table associated with the conveyer and forming a support for portions thereof and for the leaves being fed thereby, a main table arranged with its side adjacent the discharge end of the first-named table, a second set of stripping rolls, and a leaf conveyer associated therewith for conveying the leaves from the second-named table to and through the second set of rolls, substantially as described.

16. In a tobacco stemming machine and in combination, a main frame, brackets at one end thereof, a cross bar supported on the brackets, a main feed table, leaf feeding means at opposite sides thereof supported from said bar, leaf blade removing means associated with the leaf feeding means at each side of the main table, said feeding means including endless conveyers, a drive shaft common to both conveyers supported from said bar, and a drive shaft individual to each conveyer also supported by the bar and driven from the first named drive shaft, substantially as described.

17. In a tobacco stemming machine and in combination, a main frame, a supporting bar mounted thereon, a main feed table, leaf feeding means at opposite sides thereof supported from said bar, blade removing means associated with each of said feeding means, each of said feeding means including an endless conveyer, a drive shaft common to both conveyers supported from the bar, a drive shaft individual to each conveyer also supported from the bar and extending transversely across the first-named shaft, and gearing between each of the individual shafts and the first named shaft located at the points where the former cross the latter, substantially as described.

18. In a tobacco stemming machine and in combination, a main frame, a supporting bar mounted thereon, a main feed table, leaf feeding means at opposite sides thereof supported from said bar, blade removing means associated with each of said feeding means, each of said feeding means including an endless conveyer, a drive shaft common to both conveyers supported from the bar, a drive shaft individual to each conveyer also supported from the bar and extending transversely across the first-named shaft, and gearing between each of the individual shafts and the first named shaft located at the points where the former cross the latter, said gearing comprising a worm and worm wheel, substantially as described.

19. In a tobacco stemming machine and in combination, a pair of stripping rolls, means for feeding leaves thereto including an upper and a lower set of sprocket chains, sprocket wheels over which the same run, upper and lower companion gripping bars carried by the chains, a feeding table along which the leaves are advanced by hand into the path of movement of said gripping bars, a substantially vertically disposed stop surface located below the upper runs of the lower chains and in advance of the point of engagement of the companion bars with the leaves, and in the path of movement of the leaves advanced along the feed table, and supplemental stripping means arranged laterally in respect to said feed table for stripping the butt ends of the leaves, said supplemental stripping means delivering the leaves onto said table with their butt ends directed toward said stop, substantially as described.

20. In a tobacco stemming machine and in combination, a pair of stripping rolls, companion gripping bars, endless carriers therefor, wheels around which the carriers move at one end of their paths of travel, and a substantially vertical fixed stop surface located adjacent a vertical plane intersecting the axes of said wheels, and below the path of travel of the bars during the leaf-gripping action thereof, and a feed table in advance of the travel of the bars having a leaf-feeding surface terminating in advance of said fixed stop surface, substantially as described.

21. In a tobacco stemming machine and in combination, a pair of stripping rolls, companion gripping bars, endless carriers therefor, wheels around which the carriers move at one end of their paths of travel, a substantially vertical fixed stop surface located adjacent a vertical plane intersecting the axes of said wheels and below the path of travel of the bars during the leaf-gripping action thereof, and a feed table in advance of the travel of the bars having a downwardly inclined feeding surface terminating in advance of and near the lower edge of the fixed stop surface, substantially as described.

22. In a tobacco stemming machine and in combination, a pair of stripping rolls, companion gripping bars, endless carriers therefor, wheels around which the carriers move at one end of their paths of travel, a substantially vertical fixed stop surface located adjacent a vertical plane intersecting the axes of said wheels and below the path of travel of the bars during the leaf gripping action thereof, and a feed table in advance of the travel of the bars having a leaf-feeding surface terminating in advance of said fixed stop surface, said feed board having a pivoted section adjacent the stop surface, substantially as described.

23. In a tobacco stemming machine and in combination, a pair of stripping rolls, companion gripping bars, endless carriers therefor, wheels around which the carriers move at one end of their paths of travel, a substantially vertical fixed stop surface located adjacent a vertical plane intersecting the axes of said wheels and below the path of travel of the bars during the leaf gripping action thereof, and a feed table in advance of the travel of the bars having a leaf-feeding surface terminating in advance of said fixed stop surface, said feed board having a pivoted section adjacent the stop surface and in the path of travel of the lower gripping bar, substantially as described.

24. In a tobacco stemming machine and in combination, a frame providing upper and lower tracks, a pair of stripping rolls mounted in the frame with their axes extending in a direction transversely of the tracks and located respectively above and below the same, a pair of gripping bars movable along the tracks when in leaf-engaging positions, endless carriers for advancing the bars, a fixed leaf arresting surface extending transversely of the machine in advance of the lower track, and having its major portion located below the horizontal plane thereof, and a feed board designed to direct the leaves fed along the same against said fixed leaf-arresting surface, substantially as described.

25. In a tobacco stemming machine and in combination, a main frame, stripping rolls mounted therein, upper sprocket chains arranged at opposite sides of the machine, leaf-gripping bars spaced apart and connected at their ends to said chains, lower companion sprocket wheels arranged at opposite sides of the machine, companion leaf gripping bars spaced apart and connected at their ends thereto, upper and lower sprocket wheels over which the chains are guided, said wheels being arranged so as to bring the lower runs of the upper chain and the upper runs of the lower chain into juxtaposition, whereby companion gripping bars are brought together to grip the tobacco leaves, a fixed stop surface extending transversely of the machine and located inside of the path of travel of the lower bars, and a feed board for directing the leaves advanced along the same into engagement with said stop surface, substantially as described.

26. In a tobacco stemming machine and in combination, a main frame, stripping rolls mounted therein, upper sprocket chains arranged at opposite sides of the machine, leaf-gripping bars spaced apart and connected at their ends to said chains, lower companion sprocket wheels arranged at opposite sides of the machine, companion leaf-gripping bars spaced apart and connected at their ends thereto, upper and lower sprocket wheels over which the chains are guided, said wheels being arranged so as to bring the lower runs of the upper chain and upper runs of the lower chain into juxtaposition, whereby companion gripping bars are brought together to grip the tobacco leaves, a fixed stop surface extending transversely from the machine and located inside of the path of travel of the lower bars, and a feed board for directing the leaves advanced along the same into engagement with said stop surface, said board having a pivoted section crossing the path of travel of the lower bars, substantially as described.

27. In a tobacco stemming machine, a frame including a bed having inwardly extending flanges forming ways or tracks, and rails secured to opposite sides of the bed and having corresponding flanges arranged above the first-named flanges and providing corresponding ways or tracks, stripping rolls mounted in the frame and extending transversely thereof, gripping bars equipped with rollers running on the tracks, and endless carriers for said bars, substantially as described.

28. In a tobacco stemming machine, a frame including a bed having side bars provided with inwardly extending flanges providing ways or tracks, side rails bolted to said side bars and having inwardly extending flanges providing additional ways or tracks, removable space plates interposed between the adjacent faces of the side bars and rails, leaf gripping bars provided with rollers running on said track, and endless carriers for the bars with means for driving the same, substantially as described.

29. In a tobacco stemming machine and in combination, a pair of stripping rolls, means for feeding leaves between the same, and means for supporting the rolls with the weight of one roll balancing that of the other, substantially as described.

30. In a tobacco stemming machine and in combination, a pair of stripping rolls, leaf-feeding means comprising gripping bars and carriers for advancing the same, and supporting means for the rolls interconnecting them and shiftable for permitting the separation of the rolls during the passage of the bars therebetween, said supporting means equalizing the separating movement of the rolls, substantially as described.

31. In a tobacco stemming machine and in combination, leaf feeding means comprising grippings bars and carriers for advancing the same, a pair of stripping rolls between which the leaves are carried by the bars, said rolls being movable from each other to permit of the passage of the bars, and toward each other for engaging with the leaves, and means for supporting and interconnecting the rolls and for imparting substantially equal movement to both of the rolls in the aforesaid movements thereof away from and toward each other, substantially as described.

32. In a tobacco stemming machine and in combination, leaf feeding means comprising gripping bars and carriers for advancing the same, a pair of stripping rolls between which the leaves are carried by the bars, said rolls being movable from each other to permit of the passage of the bars, and toward each other for engaging with the leaves, means for supporting and interconnecting the rolls and for imparting substantially equal movement to both of the rolls in the aforesaid movements thereof away from and toward each other, and means tending to press the rolls toward each other, substantially as described.

33. In a tobacco stemming machine and in combination, leaf feeding means comprising gripping bars and carriers for advancing the same, a pair of stripping rolls between which the leaves are carried by the bars, said rolls being movable from each other for engaging with the leaves, means for supporting and interconnecting the rolls and for imparting substantially equal movement to both of the rolls in the aforesaid movements thereof away from and toward each other, and springs tending to press the rolls toward each other, substantially as described.

34. In a tobacco stemming machine and in combination, a pair of stripping rolls, supporting means therefor comprising companion levers carrying the rolls at their free ends and provided with intermeshing segments at their pivoted points, and means associated with the levers tending to press the rolls toward each other, substantially as described.

35. In a tobacco stemming machine and in combination, a pair of stripping rolls, supporting means therefor comprising companion levers carrying the rolls at their free ends and provided with intermeshing segments at their pivoted points, and yielding means associated with the levers tending to press the rolls toward each other, substantially as described.

36. In a tobacco stemming machine and in combination, a pair of stripping rolls, supporting means therefor comprising companion levers carrying the rolls at their free ends and provided with intermeshing segments at their pivoted points, yielding means associated with the levers tending to press the rolls toward each other, and an adjustable stop for limiting the movement of the rolls toward each other, substantially as described.

37. In a tobacco stemming machine and in combination, a pair of stripping rolls, means for carrying the same comprising companion levers having intermeshing gear segments adjacent their pivots, tails on the levers, and a spring interposed between the said tails, substantially as described.

38. In a tobacco stemming machine and in combination, a pair of stripping rolls, means for carrying the same comprising companion levers having intermeshing gear segments adjacent their pivots, tails on the levers, a spring interposed between the said tails, and an adjustable bearing plate for one end of the spring carried by one of the tails, substantially as described.

39. In a tobacco stemming machine and in combination, a main frame, a pair of stripping rolls extending transversely thereof, brackets secured to opposite sides of the frame, companion levers pivotally mounted in each bracket, and connected at their free ends to the adjacent ends of the rolls, said levers being provided with intermeshing gear segments and with tails, and a spring interposed between the tails, substantially as described.

40. In a tobacco stemming machine and in combination, a main frame, a pair of stripping rolls extending transversely thereof, brackets secured to opposite sides of the frame, companion levers pivotally mounted in each bracket, and connected at their free ends to the adjacent ends of the rolls, said levers being provided with intermeshing gear segments and with tails, a spring interposed between the tails, means carried by one of the tails for adjusting the tension of the spring, and a stop carried by the bracket coöperating with the other tail for limiting the movement of the levers and therethrough the movement of the rolls toward each other substantially as described.

41. In a tobacco stemming machine and in combination, a pair of stripping rolls, upper and lower leaf gripping bars, conveyers therefor, movable supports for the rolls, means for moving the supports in unison whereby the rolls move equally toward and from their initial positions, and a pivoted arm mounted on the fixed frame and operated by one of the conveyers for lifting the upper of the two rolls as the gripping bars approach said rolls, substantially as described.

42. In a tobacco stemming machine and in combination, a pair of stripping rolls, means for supporting the same for permitting of the movement thereof toward and from each other, a pivoted arm for lifting the upper roll, upper and lower gripping bars, upper and lower chains carrying the same, and contacting members associated with the lower chain and arranged in line with the lower bars for acting upon said arms to raise the latter and thereby separate the rolls for the passage of the bars, substantially as described.

43. In a tobacco stemming machine and in combination, a main frame provided with tracks at opposite sides thereof, stripping rolls, supports therefor for permitting the rolls to move toward and from each other, pivoted arms coöperating with the upper roll to raise the same, upper and lower gripping bars, upper and lower chains carrying the same, rollers carried by the lower chain in alinement with the lower bars for coöperating with said arms, and additional rollers carried by the lower chain and mounted coaxially with the first-named rollers and designed to run upon said track, substantially as described.

44. In a tobacco stemming machine and in combination, a pair of stripping rollers, upper and lower leaf-gripping bars having sockets in their opposite ends, conveying chains therefor, and connections between the chains and bars comprising links having studs projecting into the socket in the bars, substantially as described.

45. In a tobacco stemming machine and in combination, a pair of stripping rollers, upper and lower leaf-gripping bars having sockets in their opposite ends, conveying chains therefor, connections between the chains and bars comprising links having studs projecting into the socket in the bars, said links associated with the chains of the lower bars having outwardly extending studs forming supports, rolls thereon, and means for separating the stripping rollers, including arms acted upon by said rolls, substantially as described.

46. In a tobacco stemming machine, a leaf gripping member comprising a bar having a serrated face, lugs at each edge of the ends of the bar, and pairs of rollers journaled in the lugs, substantially as described.

47. In a tobacco stemming machine comprising a frame having side bars provided with inwardly extending slotted flanges, stripping rollers supported on the frame and having movement toward and from each other, and lifting arms working in the slots in the flanges, each of said arms being pivotally connected at one end to the adjacent flange, having a part for coöperating with the adjacent portion of the shaft of the upper stripping roll, and having a nose finding a bearing on said flange, substantially as described.

48. In a tobacco stemming machine comprising a frame having side bars provided with inwardly extending slotted flanges, stripping rollers supported on the frame and having movement toward and from each other, and lifting arms working in the slots in the flanges, each of said arms being pivotally connected at one end to the adjacent flange, having a part for coöperating with the adjacent portion of the shaft of the upper stripping roll, and having a nose finding a bearing on said flange, said nose being equipped with a cushioning spring, substantially as described.

49. In a tobacco stemming machine and in combination, leaf stripping rolls, leaf feeding means comprising upper and lower conveyers and upper and lower companion leaf-gripping bars carried thereby, a stem severing knife movable about the axis of one of the rolls, and means for operating the same associated with one of the conveyers, substantially as described.

50. In a tobacco stemming machine and in combination, upper and lower stripping rolls, leaf-feeding means comprising upper and lower conveyers and companion leaf-gripping bars carried thereby, a stem severing knife, plates carrying the same movable about the axis of the upper roll, means tending to hold the knife out of cutting position, means for moving the knife into cutting position, including a bar having a pivotal sliding movement, and a bar depending therefrom and adjustable lengthwise thereof, and means for raising the last-named bar comprising projections on the lower conveyer arranged in alinement with the gripping bars associated therewith, substantially as described.

51. In a tobacco stemming machine and in combination, upper and lower stemming rolls, leaf-feeding means comprising upper and lower conveyers, companion leaf gripping bars carried thereby, means for separating the rolls, including contact members carried by the lower conveyer, said members being disposed in alinement with the gripping bars associated therewith, a stem severing knife, plates carrying the same movable about the axis of the upper roll, springs associated with said plates tending to hold the knife out of cutting position, and means for moving the knife into cutting position operated by the aforesaid contact members, substantially as described.

52. In a tobacco stemming machine and in combination, upper and lower stemming rolls, leaf-feeding means comprising upper and lower conveyers, companion leaf-gripping bars carried thereby, means for separating the rolls, including contact members carried by the lower conveyer, said members being disposed in alinement with the gripping bars associated therewith, a stem severing knife, plates carrying the same movable about the axis of the upper roll, springs associated with said plates tending to hold the knife out of cutting position, means for moving the knife into cutting position operated by the aforesaid contact members, and including a bar having a sliding pivotal movement, and a second bar adjustably mounted thereon and depending therefrom, and provided with an inclined surface at its lower end for coaction with contact members moving in the plane thereof, substantially as described.

53. In a tobacco stemming machine and in combination, a pair of stripping rolls, means for giving the rolls a rotary movement for clearing them of the accumulated leaf blades, including sprocket wheels fixed to the shaft of the rolls, additional sprocket wheels, sprocket chains running over companion sprocket wheels, a main drive shaft, a pitman operated therefrom, and a drive connection between the pitman and said sprocket chains, substantially as described.

54. In a tobacco stemming machine and in combination, a pair of stripping rolls, means for giving the rolls a rotary movement for clearing them of the accumulated leaf blades, including sprocket wheels fixed to the shafts of the rolls, additional sprocket wheels, sprocket chains running over companion sprocket wheels, a main drive shaft, a pitman operated therefrom, and a drive connection between the pitman and said sprocket chains, said connection driving the chains in the movement of the pitman in one direction, and moving independent of the chains on the movement of the pitman in an opposite direction, substantially as described.

55. In a tobacco stemming machine, a pair of stripping rolls, sprocket wheels associated therewith, companion sprocket wheels, sprocket chains running over the first named sprocket wheels and said companion sprocket wheels, a main drive shaft, and means for intermittently rotating the stripping rolls therefrom including driving means directly engaging the chains independently of the sprocket wheels, substantially as described.

56. In a tobacco stemming machine and in combination, companion stripping rolls arranged one above the other, a sprocket wheel associated with each of said rolls, a sprocket chain for each of said wheels, sprocket wheels apart from the stripping rolls carrying said chains, a main drive shaft, and means for intermittently rotating the stripping rolls therefrom, including a pitman driven from the main drive shaft, and means for automatically coupling and uncoupling the pitman to said chains, substantially as described.

57. In a tobacco stemming machine, a pair of stripping rolls, a pair of sprocket chains associated therewith, a main drive shaft, a pitman, means interposed between the drive shaft and the pitman for operating the latter, and means for automatically coupling the pitman to the sprocket chains in the movement of the pitman in one direction, and for releasing said coupling in the movement of the pitman in the opposite direction, substantially as described.

58. In a tobacco stemming machine, a pair of stripping rolls, a pair of sprocket chains associated therewith, a main drive shaft, a pitman, means interposed between the drive shaft and the pitman for operating the latter, a sliding member, a sprocket wheel and detent individual to each of the aforesaid sprocket chains mounted in said member, a lost motion connection between the member and pitman, including a double detent, movable into and out of locking engagement with said ratchet wheels, substantially as described.

59. In a tobacco stemming machine, a pair of stripping rolls, a pair of sprocket chains associated therewith, a main drive shaft, a pitman, driving connections between the drive shaft and pitman including mutilated intermeshing gears, and a drive connection between the pitman and said sprocket chains, including means for automatically rendering said connection effective and ineffective, substantially as described.

60. In a tobacco stemming machine, a pair of stripping rolls, a pair of sprocket chains, a pair of sprocket wheels for each chain, corresponding members thereof being fixedly secured to the stripping rolls, a main drive shaft, drive gearing interposed between the latter and the remaining sprocket wheels of said pairs of sprocket wheels, a pitman, means for driving the same actuated from the main drive shaft, and a connection for coupling the pitman to the sprocket chains, said connection being adapted to be released during the movement of the pitman in one direction, substantially as described.

61. In a tobacco stemming machine, a pair of stripping rolls, sprocket chains associated therewith, a main drive shaft, a crank shaft, driving connections between the main drive shaft and crank shaft including mutilated gears, one of the gears being adjustable, a crank swiveled on the crank shaft, buffers mounted on one end of said crank, a second crank keyed to the crank shaft and having its free end coöperating with the buffers, a pitman connected at one end to the end of the first named crank opposite to the end thereof carrying the buffers, and a clutch connection between the other end of the pitman and said chains, substantially as described.

62. In a tobacco stemming machine and in combination, a pair of stripping rolls, a sprocket wheel carried by each roll, additional sprocket wheels, a sprocket chain associated with each roll and running over the sprocket wheel thereof, and one of the additional sprocket wheels, a main drive shaft, intermittently operated driving mechanism interposed between the main drive shaft and the chains for giving the same an intermittent movement, intermeshing gears associated with the shafts of said additional sprocket wheels, a driving gear meshing with one of the last-named gears, and a drive connection between the main drive shaft and said driving gear, substantially as described.

63. In a tobacco stemming machine and in combination, a pair of stripping rolls, a sprocket wheel carried by each roll, additional sprocket wheels, a sprocket chain associated with each roll and running over the sprocket wheel thereof and one of the additional sprocket wheels, a main drive shaft, intermittently operated driving mechanism interposed between the main drive shaft and the chains for giving the same an intermittent movement, intermeshing gears associated with the shafts of said additional sprocket wheels, a driving gear meshing with one of the last-named gears, and a drive connection between the main drive shaft and said driving gear, said driving connection including intermeshing mutilated gears, substantially as described.

64. In a tobacco stemming machine and in combination, a pair of stripping rolls, a sprocket wheel carried by each roll, additional sprocket wheels, a sprocket chain associated with each roll and running over the sprocket wheel thereof and one of the additional sprocket wheels, a main drive shaft, intermittently operated driving mechanism interposed between the main drive shaft and the chains for giving the same an intermittent movement, intermeshing gears associated with the shaft of said additional sprocket wheels, a driving gear meshing with one of the last-named gears, a drive connection between the main drive shaft and said driving gear, said connection including a train of intermeshing gears, a constantly driven sprocket wheel, and a clutch connection between the sprocket wheel and one member of said train of gears, substantially as described.

65. In a tobacco stemming machine and in combination, a pair of stripping rolls, means for giving the same a rotative movement during the stripping action, including sprocket wheels fixed above stud shafts, a gear associated with each of said shafts, said gears meshing with each other, a clutch connection between each gear and the shaft carrying the same, a driving gear meshing with one of the last-named gears, an adjustable bearing therefor, a main drive shaft, and drive connections between the same and the main drive shaft, including a clutch device, substantially as described.

66. In a tobacco stemming machine and in combination, a pair of stripping rolls, means for giving the same a rotative movement during the stripping action, including sprocket wheels fixed about stud shafts, a gear associated with each of said shafts, said gears meshing with each other, a clutch connection between each gear and the shaft carrying the same, a supporting bracket, a bearing member adjustably supported thereby, a sleeve journaled in the bracket, a sprocket wheel fixed to the sleeve, a main drive shaft, a drive connection between the same and the sprocket wheel fixed to the sleeve, a shaft extending through the bore of the sleeve threaded at one end, a nut thereon, a gear connected to the opposite end of the shaft adapted to be coupled to and uncoupled from the sleeve by manipulating the nut, and a train of gears mounted in the bearing member driven from the last-named gear, said train of gears imparting movement to one of the gear wheels first named, substantially as described.

67. In a tobacco stemming machine and in combination, a leaf-stripping roll comprising a sectional shell having internal ribs, expanders within the shell, a strip of card clothing wound about the shell, and means for adjusting the expanders to compensate for any stretch in the card clothing, substantially as described.

68. In a tobacco stemming machine, a stripping roll comprising a sectional shell having internal ribs, truncated conical expanders within the shell coöperating with the ribs, a strip of card clothing wound about the shell, head plates having means for the connection thereto of the ends of the card clothing strip, and means for adjusting the expanders interposed between the same and the head plates most remote therefrom, substantially as described.

69. In a tobacco stemming machine, a leaf-stripping roll including a shell, a strip of card clothing wound thereon, head plates with means thereon for receiving the ends of the strip of card clothing, said means comprising spaced-apart lugs, and screws mounted in one of said lugs and coacting with the companion lug, substantially as described.

70. In a tobacco stemming machine and in combination, a pair of stripping rolls, means for carrying the leaves to be stripped to and between the rolls comprising companion bars extending transversely of the machine, conveyers for the bars located at opposite sides of the machine, and a plurality of loose chains arranged side by side and depending in the path of movement of each bar and adapted to clean the same by wiping across the leaf engaging face thereof, substantially as described.

71. In a tobacco stemming machine and in combination, companion stripping rolls, a leaf conveyer associated therewith, and a supplemental conveyer or binder coacting with the first named conveyer and comprising a member provided with a track, an endless band movable with the first named conveyer, and anti-friction means between the band and track including a flat metallic coil having free ends, and the end of the outside coil extending in the direction of rotation of the band, and a series of rollers interposed between the coil and the track.

72. In a tobacco stemming machine and in combination, a supporting frame, a pair of leaf-stripping rolls, companion leaf gripping bars, conveyers for the bars having links to which the bars are attached, a connection between the bars and conveyers permitting of limited rocking movement of the bars in relation to the attached links of the conveyer, substantially as described.

73. In a tobacco stemming machine, stripping rolls, a leaf-gripping member comprising a bar having sockets in its opposite ends, a chain conveyer for the bar at each end of the same, studs projecting from the coveyer into the sockets in the bar, and means for retaining the studs in position and permitting of a limited rocking movement of the bar about the axis of said studs, substantially as described.

74. In combination, stripping rolls, means for carrying tobacco leaves between said rolls and means for cutting the stems of the leaves from the blades thereof, said cutting means being located on the side of the rolls from which the stripped stems emerge whereby a portion of the stem at or near the tip of the leaf will remain with the stripped blade, substantially as described.

75. In a tobacco stemming machine and in combination, leaf feeding means comprising gripper bars, and carriers for advancing the same, a pair of stripping rolls between which the leaves are carried by the bars, said rolls being movable toward and from each other and when apart permitting the gripper bars to pass unobstructed, pivoted arms one for each roll for supporting the same, and means for interconnecting said pivoted arms, whereby an equal separating and closing movement of said rolls will be effected at all times.

In testimony whereof, I affix my signature in presence of two witnesses.

FREDERICK C. SCHOFIELD.

Witnesses:
H. M. BARRETT,
BENNETT S. JONES.